No. 777,474. PATENTED DEC. 13, 1904.
M. E. JONES & J. E. SCHAFER.
BALING PRESS.
APPLICATION FILED JUNE 27, 1904.
NO MODEL. 5 SHEETS—SHEET 1.
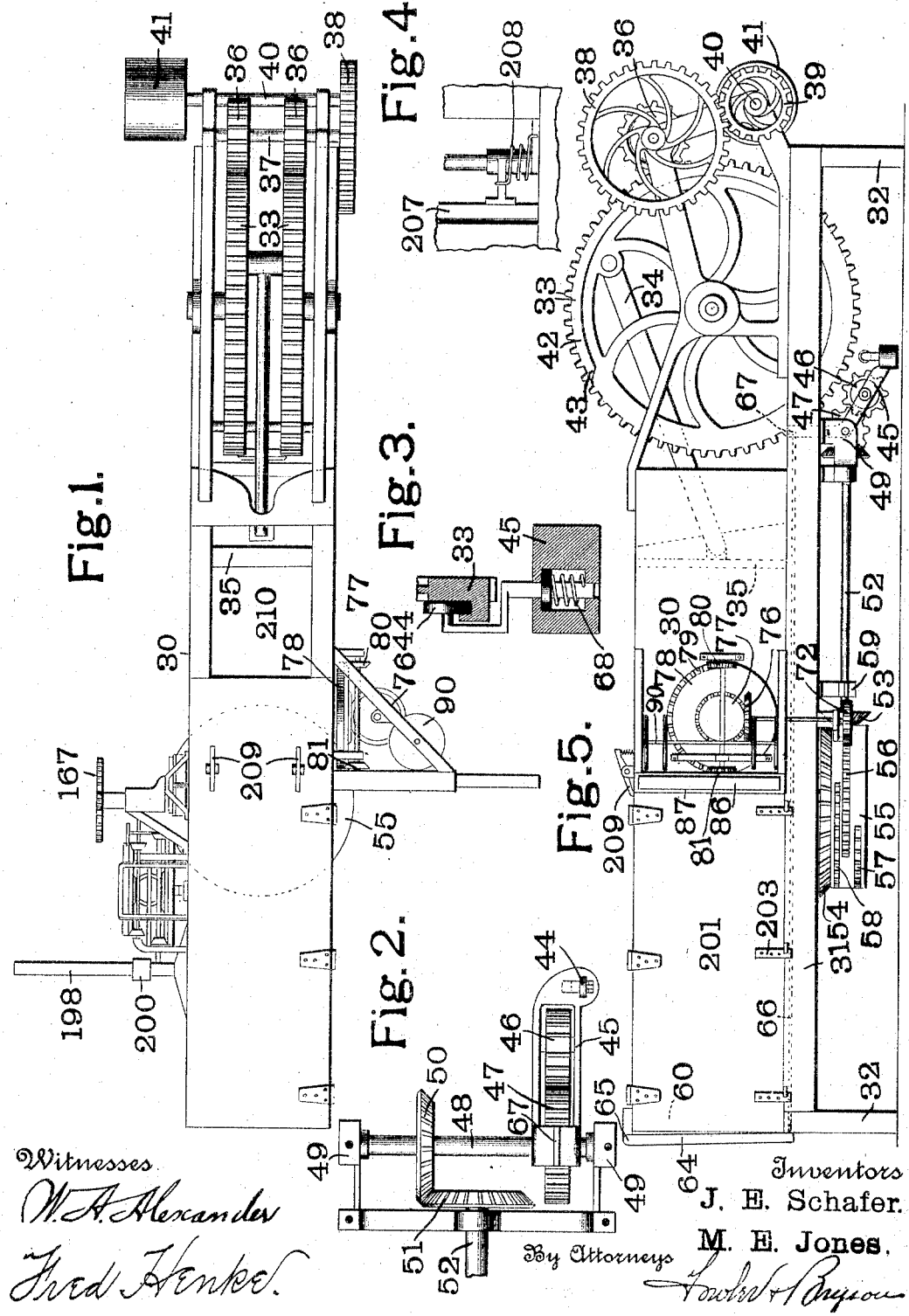

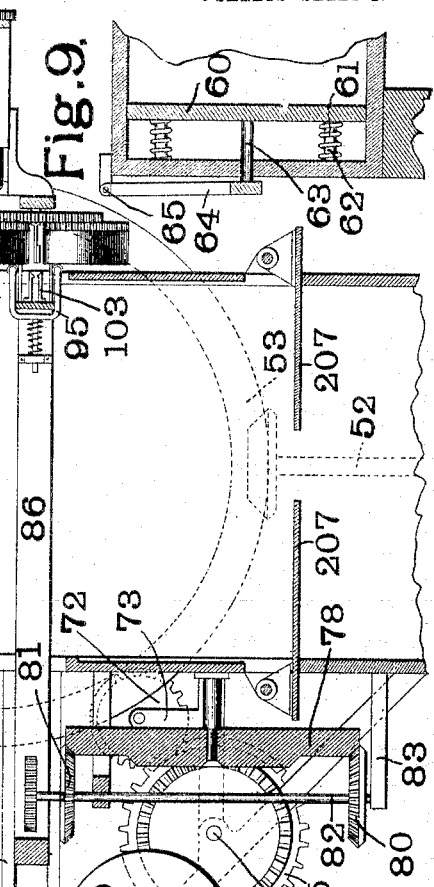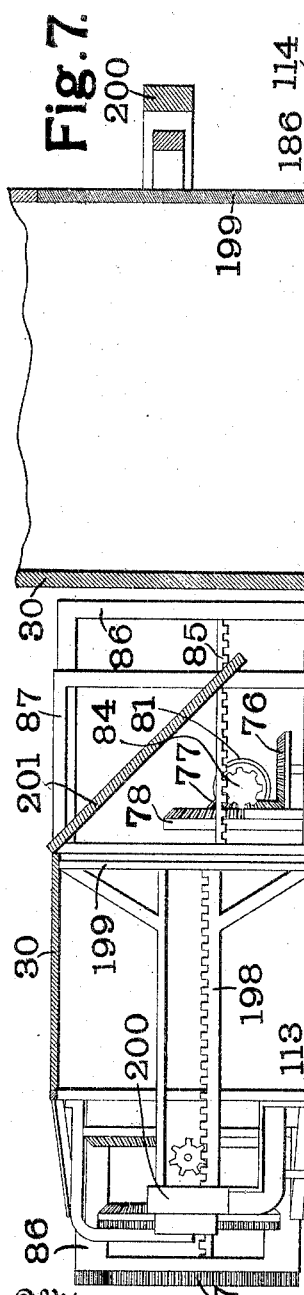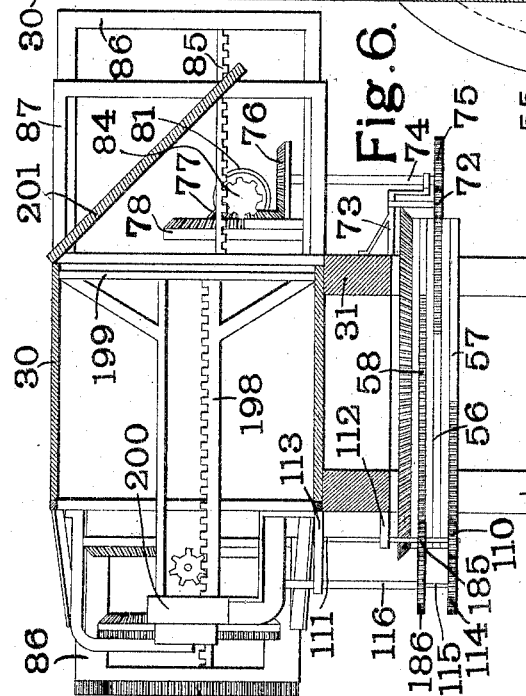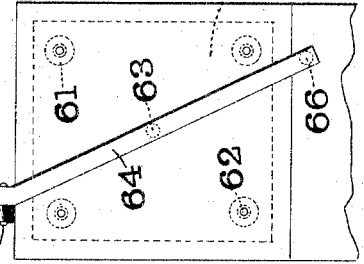

No. 777,474. PATENTED DEC. 13, 1904.
M. E. JONES & J. E. SCHAFER.
BALING PRESS.
APPLICATION FILED JUNE 27, 1904.
NO MODEL. 5 SHEETS—SHEET 3.

Witnesses
W. A. Alexander
Fred Henkel

Inventors
J. E. Schafer.
M. E. Jones.
By Attorneys

No. 777,474. PATENTED DEC. 13, 1904.
M. E. JONES & J. E. SCHAFER.
BALING PRESS.
APPLICATION FILED JUNE 27, 1904.
NO MODEL. 5 SHEETS—SHEET 4.
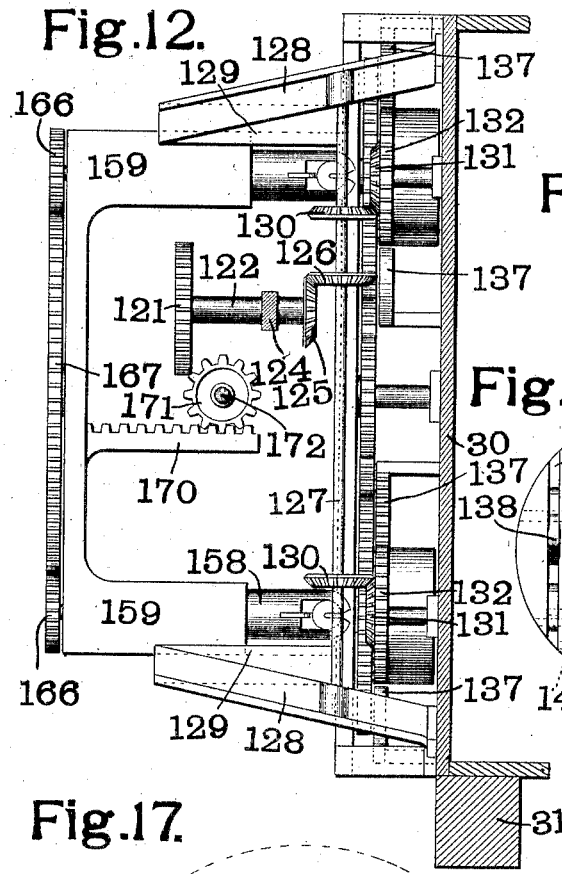
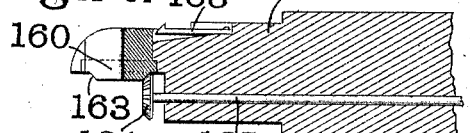
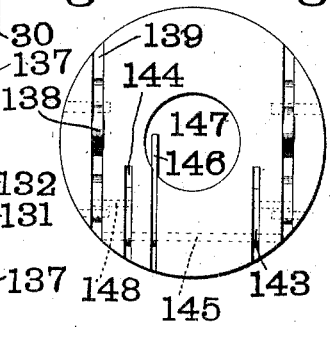
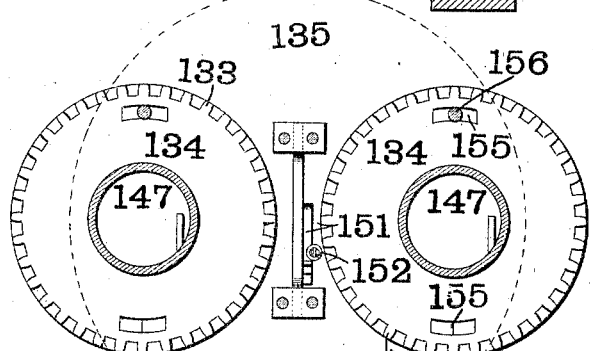
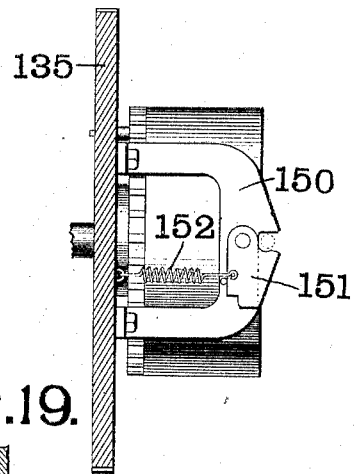
Witnesses
W. A. Alexander
Fred Henke
Inventors
J. E. Schafer.
M. E. Jones.
By Attorneys
Fowler H. Bryson

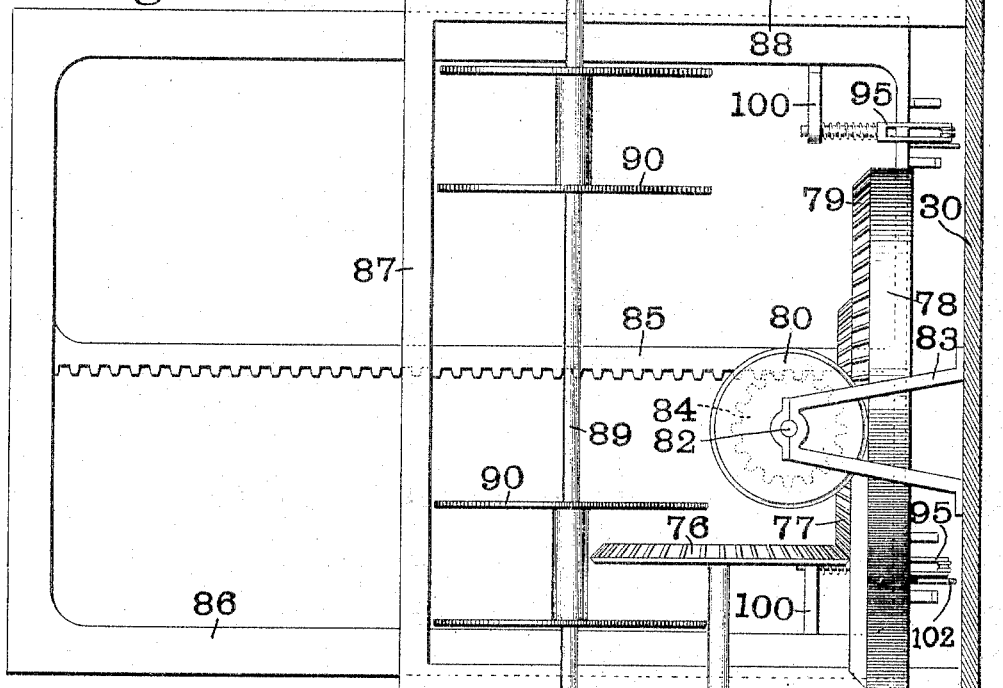
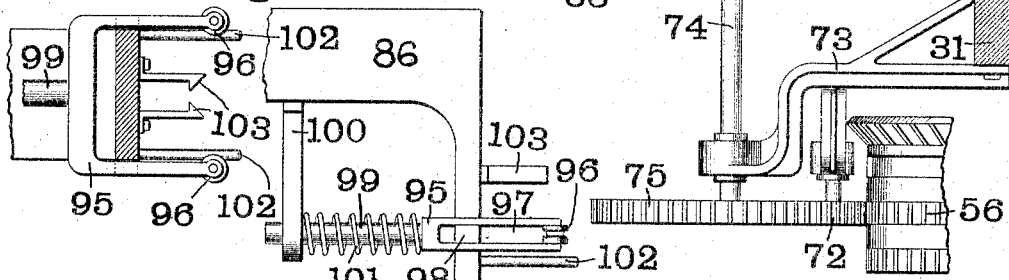
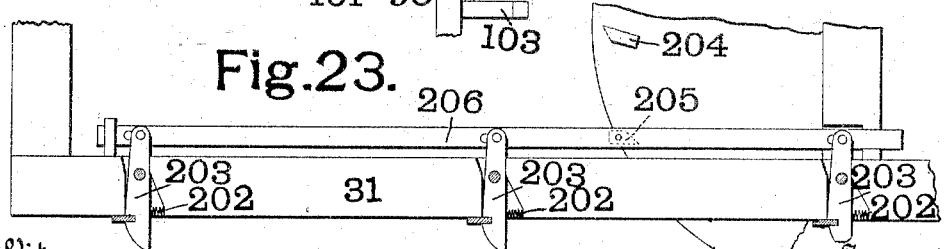

No. 777,474.

Patented December 13, 1904.

UNITED STATES PATENT OFFICE.

MARSHAL E. JONES AND JOHN E. SCHAFER, OF SPARTA, ILLINOIS.

BALING-PRESS.

SPECIFICATION forming part of Letters Patent No. 777,474, dated December 13, 1904.

Application filed June 27, 1904. Serial No. 214,256. (No model.)

*To all whom it may concern:*

Be it known that we, MARSHAL E. JONES and JOHN E. SCHAFER, citizens of the United States, residing at the city of Sparta, county of Randolph, State of Illinois, have invented a certain new and useful Improvement in Baling-Presses, of which the following is such a full, clear, and exact description as will enable any one skilled in the art to which it appertains to make and use the same, reference being had to the accompanying drawings, forming part of this specification.

The object of our invention is to provide a baling-press which will be automatically actuated when the bale has reached a sufficient size and state of compression to bring into operation mechanism for feeding the wire around the bale, severing and twisting the wire, and ejecting the bale from the press.

Our invention consists in various novel features and details of construction, all of which will be described in the following specification, and pointed out in the claims affixed hereto.

Figure 10:
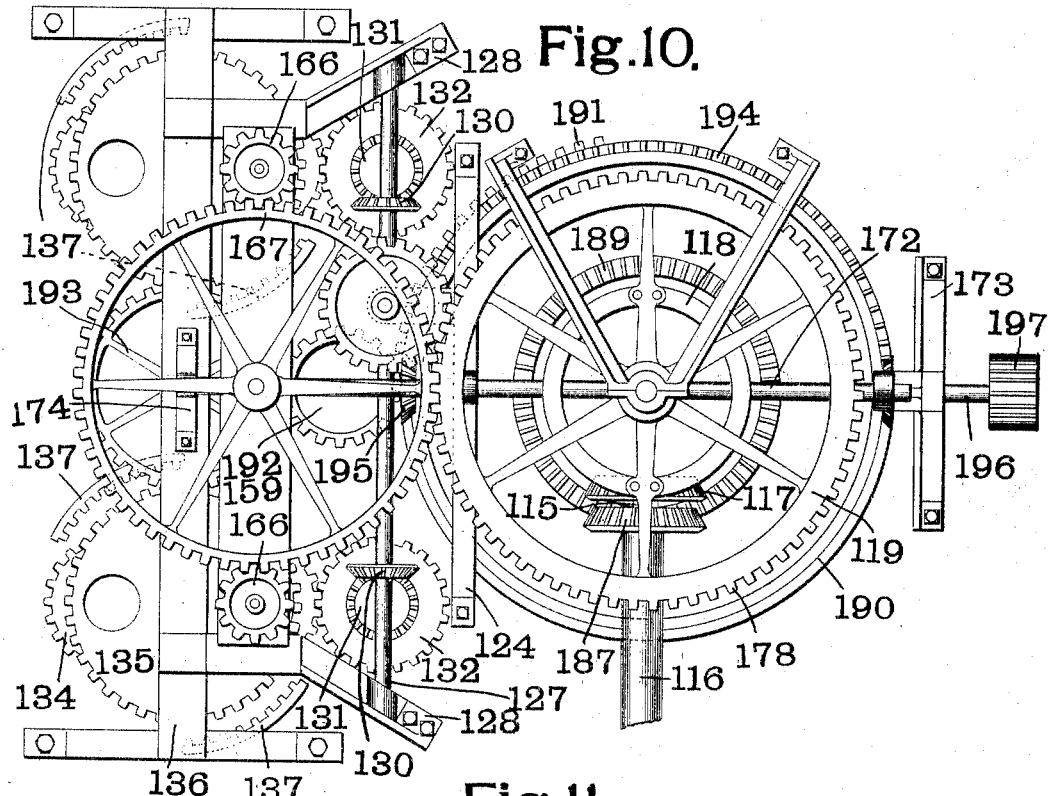
Figure 11:
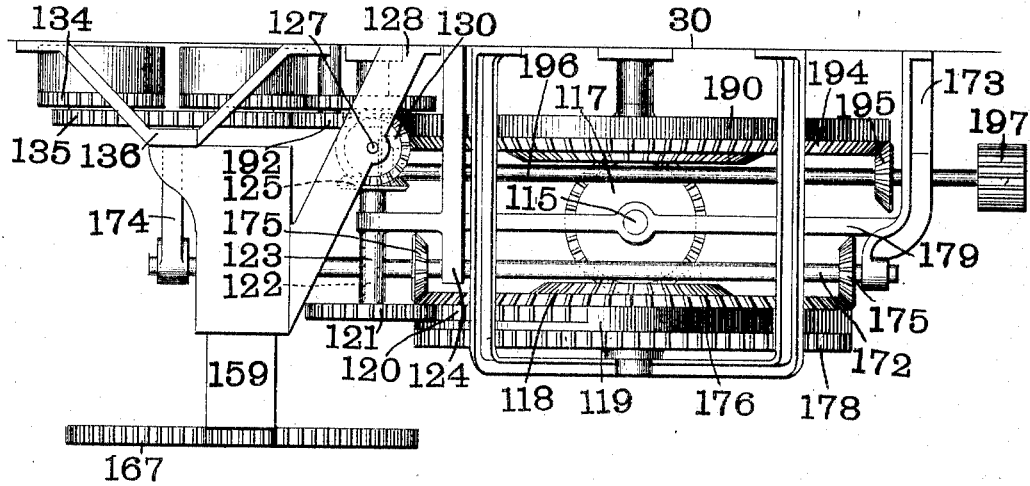

In the accompanying drawings, which illustrate one form of baling-press made in accordance with our invention, Figure 1 is a top plan view on a reduced scale. Figs. 2, 3, and 4 are enlarged views showing details of construction. Fig. 5 is a side elevation on a reduced scale. Fig. 6 is a cross-section. Fig. 7 is a horizontal section through a portion of the machine. Figs. 8 and 9 are detailed views showing the device for automatically throwing the twisting mechanism into operation. Fig. 10 is a side elevation of the twisting mechanism. Fig. 11 is a top plan view of the parts shown in Fig. 10. Fig. 12 is partly an end view and partly a section of the twisting mechanism. Figs. 13 and 14 are an enlarged side view and section, respectively, of the wire-twisting device. Figs. 15 and 16 are a front view and a section, respectively, of the clamp-holding devices. Fig. 17 is a rear view of the clamp-holding devices. Fig. 18 is a section of the parts shown in Fig. 17. Fig. 19 is an enlarged sectional view showing a detail of construction. Fig. 20 is an enlarged view of the mechanism for feeding the wire around the bale. Figs. 21 and 22 are enlarged details of some of the parts shown in Fig. 20, and Fig. 23 is a view showing the devices for releasing the door.

Like marks of reference refer to similar parts in the several views of the drawings.

30 represents the frame or casing of the press. This frame or casing 30 is carried on a base 31, supported on feet 32. At the forward end the base 31 projects beyond the casing 30 and supports a pair of toothed wheels 33. These wheels have pivoted between them a pitman-rod 34, driving a plunger 35, working in the casing 30.

36 represents a pair of pinion-wheels meshing with the wheels 33. These wheels 36 are rigidly carried on a shaft 37, which also has rigidly secured to it a gear-wheel 38. This gear-wheel 38 in turn meshes with a gear-wheel 39 on a shaft 40. Secured to the opposite end of the shaft 40 is the driving-pulley 41, by means of which power is applied to the press.

One of the wheels 33 is provided with a grooved track 42, extending partially around the said wheel at one side thereof and having an inclined end 43. This inclined end 43 is adapted to coöperate with a roller 44 to move a frame 45. The movement of the frame 45 brings a gear-wheel 46 in mesh with the said wheel 33. This gear-wheel 46 in turn meshes with a gear-wheel 47, rigidly carried on a shaft 48, supported from the base 30 by means of a bracket 49. Rigidly secured on the shaft 48 is a bevel gear-wheel 50, meshing with a bevel gear-wheel 51 on a shaft 52. This shaft 52 extends beneath the base 31 and carries a bevel gear-wheel 53, which meshes with a bevel-gear 54 on a large wheel 55, supported beneath the base 31. This large wheel 55 is provided on its periphery with three mutilated gears 56, 57, and 58, respectively, which drive the mechanism for feeding the wire around the bale, twisting the wire, and ejecting the bale, as will be hereinafter more fully described. The shaft 52, hereinbefore referred to, is supported at its forward end by the bracket 49 and at its rear end by a bracket 59.

Situated in the end of the casing 30 is a movable end piece 60, Figs. 8 and 9, against which the bale presses when in course of formation. This end piece 60 is normally held against movement by means of springs 61, preferably surrounding guide-pins 62, carried by the said end piece 60. The end piece 60 is also provided with a pin 63, which bears against a lever 64, pivoted at 65 to the casing 30 and having secured to its lower end a rod 66, which extends back beneath the press and is connected to an upward extension 67 on the frame 45, hereinbefore described. When the bale presses against the end piece 60 with sufficient pressure to compress the springs 61, the rod 66 will be drawn forward by the movement of the lever 64 and will move the frame 45, so as to bring the wheel 44 in the path of the inclined end 43 of the guide or track 42, and when the said wheel is engaged by the said inclined end the wheel 46 will be drawn up into mesh with the wheel 33. In order to prevent injury to the parts of the machine in case the wheel 44 should come in contact with the periphery of the track 42, we movably mount the said wheel in the end of the frame 45. A spring 68 normally holds the said wheel 44 in its raised position, but will allow it to be depressed in case it is drawn up against the periphery of the track 42.

The mutilated gear 56 meshes with an idle wheel 72, carried by a bracket 73, secured to the base 31. The bracket 73 also supports a shaft 74, having rigidly secured to its lower end a gear-wheel 75, meshing with the idle wheel 72. The shaft 74 has rigidly secured to its upper end a beveled gear-wheel 76, meshing with a bevel-gear 77, formed on a wheel 78, mounted on the casing 30. This gear-wheel 78 is provided with a mutilated bevel-gear 79, which alternately coöperates with the bevel gear-wheels 80 and 81, respectively, mounted upon a shaft 82, journaled in brackets 83. Secured to the end of the shaft 82 is a pinion 84, which meshes with a rack 85, carried by a sliding frame 86, which is adapted to feed the wires across the press to the twisting mechanism. This sliding frame 86 runs in a guide 87, secured to the casing 30. Extending from the outer end of the guide 87 to the casing 30 are braces 88. The lower brace 88 in addition to bracing the guide 87 also helps to support the shaft 74, hereinbefore described. The braces 88 also have pivoted in them a shaft 89, on which are mounted the spools 90 for containing the wire for securing the bale. The frame 86 is provided at its inner end and near its upper and lower edges with duplicate sets of devices for feeding the wire to the wire-clamps and also for operating the clamps to secure the wire in position and operating the cutting device to sever the wire.

95 is a U-shaped part embracing the inner part of the frame 86 and carrying at its ends sheaves 96, around which the wire is adapted to pass. This U-shaped part 95 is provided with slots 97, receiving guide-blocks 98 on the frame 86. Projecting rearwardly from the part 95 is a rod 99, which passes through a bracket 100. Between the bracket 100 and the part 95 is a coil-spring 101, which normally holds the said part 95 in its forward position. 102 are pins carried by the frame 86 and adapted to operate the wire-clamping devices, as will be hereinafter described. 103 are spring-hooks for operating the wire-severing device, as will be hereinafter described.

Meshing with the mutilated gear 57 is an idle wheel 110, loosely carried on a shaft 111. This shaft 111 is supported by brackets 112 and 113, Fig. 6. The idle wheel 110 meshes with a gear-wheel 114, rigidly carried on the lower end of a shaft 115. This shaft 115 is loosely journaled in the sleeve 116, supported in the bracket 113. Rigidly secured to the upper end of the shaft 115 is a bevel-gear 117, which meshes with a bevel-gear 118, carried by a large wheel 119. This wheel 119 is provided with a mutilated gear 120, which meshes with a gear-wheel 121, rigidly secured on a short shaft 122. This shaft 122 is supported in a bearing 123, carried by a bracket 124. At the opposite end of the shaft 122 is a bevel gear-wheel 125. This bevel gear-wheel 125 meshes with a bevel gear-wheel 126 on a shaft 127. This shaft 127 is journaled in braces 128, supporting guides 129. The shaft 127 is also provided with a pair of bevel gear-wheels 130. Each of these bevel-gears 130 mesh with a bevel gear-wheel 131, carried on an idle wheel 132, mounted on the frame or casing 30. These wheels 132 mesh with teeth 133, formed on clamp-holders 134.

The clamp-holders 134 are arranged in pairs and are rotatably mounted on a rotary member 135. The members 135 are rotatably mounted on a bracket 136. This bracket 136 also helps to support the guides 129, hereinbefore referred to. Secured to the casing 30, directly above and below each of the rotary members 135, is a toothed concave 137, adapted to engage with the teeth 133 on the clamp-holders 134 when the members 135 are rotated. Each of the clamp-holders 134 is provided with a pair of wire-clamps 138, arranged in slots 139 in the said clamp-holders and each provided with a hook 140 for engaging with the wire. In each of the slots 139 is a dog 141, adapted to engage with a shoulder on the wire-clamp 138 and hold it in position to lock the wire. Each of the wire-clamps 138 is also provided with a rounded recess 142, adapted to be engaged by one of the pins 102, hereinbefore described.

143 represents a pair of arms arranged in slots 144 and rigidly secured to a rock-shaft 145. Rigidly secured to the rock-shaft 145 is an arm 146, which projects into the central opening 147 of the clamp-holder 134. The arms 143 rest upon pins 148, carried by the dogs 141, and are adapted to release the said dogs from the wire-clamps when the arm 146 is operated, as will be hereinafter described.

Arranged on each of the rotary members 135 between the two clamp-holders 134 is a wire-cutter 150. Each of the wire-cutters 150 is provided with a movable jaw 151, adapted to be engaged by one of the spring-hooks 103, hereinbefore described. In order to hold the movable jaw 151 in its normal position, it is attached by means of a spring 152 to the rotary member 135.

In order to prevent the accidental rotation of the clamp-holders 134, each of the said holders is provided with two diametrically opposite inclined recesses 155, Fig. 17, which are engaged by a pin 156, yieldingly mounted in the rotary member 135, as best shown in Fig. 19. The pin 156 is held in its normal position by means of a spring 157.

158 represents a pair of cylindrical members which are adapted to pass through the central openings 147 of the clamp-holders 134. These cylindrical members 158 are carried on a frame 159, slidingly mounted in the guides 129, hereinbefore described. In the forward end of each of the cylindrical members 158 is rotatably mounted a slotted member 160, adapted to receive and twist the wire to secure the same around the bale. The slot 161 in the member 160 has a beveled opening 162, by means of which the wire enters the said slot 161. Formed on the member 160 is a bevel-gear 163, which meshes with a bevel gear-wheel 164, mounted on a shaft 165. This shaft 165 passes back through the cylindrical member 158 and the frame 159 and has secured to its rear end a pinion-wheel 166. The two pinion-wheels 166 are driven by a large idle wheel 167, mounted on the frame 159. 168 is a spring-latch carried by the cylindrical member 158 and adapted to engage with the arm 146, hereinbefore described.

170 is a rack carried by the frame 159 and engaging with a pinion 171, carried on the end of a shaft 172. This shaft 172 is supported in brackets 173 and 174 and has rigidly mounted on it two bevel gear-wheels 175, which mesh with a mutilated gear 176 on the wheel 119, hereinbefore described, in order to operate the frame 159 to move the cylindrical parts 158 into and out of the central openings 147 of the clamp-holder 134.

The gear-wheel 167 is adapted to be brought into mesh with teeth 178, carried by the wheel 119.

Extending between the brackets 124 and 173 is a bar 179, forming a bearing for the upper end of the shaft 115.

The mutilated gear 58 on the wheel 55 meshes with an idle wheel 185, loosely mounted on the shaft 111, hereinbefore described. This idle wheel 185 in turn meshes with a gear-wheel 186, rigidly secured to the lower end of the sleeve 116. Secured to the upper end of the said sleeve 116 is a bevel-gear 187, which meshes with a bevel-gear 189, carried on a wheel 190. The wheel 190 is provided with a mutilated gear 191, which meshes with an idle wheel 192 on the casing 30. The idle wheel 192 meshes with a second idle wheel 193, carried on the bracket 136, hereinbefore described, and the said wheel 193 meshes with the two rotary members 135. The wheel 190 is also provided with a mutilated gear 194, which drives a pair of bevel-gears 195, rigidly secured to a shaft 196, carried in the brackets 124 and 173. This shaft 196 has secured to its end a pinion 197, meshing with a rack 198, carried by an ejector 199 for discharging the bale from the press. The rack 198 runs in a guide 200, secured to the casing 30.

The casing 30 is provided at the side opposite to the ejector 199 with a door 201 of sufficient size to allow the discharge of the bale from the said casing. This door 201 is held by catches 203, which are adapted to be released by a cam-finger 204, carried on the wheel 55 and adapted to strike against a cam-block 205, carried on a rod 206. The rod 206 is connected with the catches 203, as shown in Fig. 23, so as to release said catches. The catches 203 are held in their normal position by springs 202.

In order to insure the formation of a square end of the forward end of the bale, we provide the casing 30 with a pair of pivoted wings 207, which project into the said casing, as shown in Fig. 7. These wings are adapted to give sufficient resistance to the bale to insure the formation of a square end. The spring 208, however, allows the wings to open back flat against the sides of the casing in order to allow the bale to pass back into the press. The material of the bale is prevented from returning after the plunger moves out of contact therewith by means of the usual spring-fingers 209.

210 is the opening for the admission of the material to be baled.

The operation of our press is as follows: The wire is first passed across the press from the spools 90 and the ends of the wire are fastened in the rear wire-clamps 138 of the rear clamp-holder 134 of each set of holders. As the operation of the two sets of holders are identical, only one will be described. Moreover, it will be understood that if it is so desired the press may be provided with additional sets of holders, so that more than two wires may be secured around the bale. After the wire is fastened in position in the wire-holder the press is started in operation, the material to be baled being fed into the press through the opening 210, Fig. 1. The material is forced to the rear by the action of the plunger 35. The material will be first forced against wings 207, Fig. 7. The wings are held in their normal position by means of the springs 208, Fig. 4, with sufficient force to insure the formation of a square end upon the bale. As soon, however, as sufficient pressure is brought to bear against the material the wings 207 will be forced back against the sides of the press, so that the bale may pass on toward the rear of the press. The bale carries with it the wires which have been previously stretched across the press. As soon as sufficient material has been fed into the press the end of the bale will come into contact with the end piece 60 and when the compression of the bale is sufficient the spring 62 will be compressed, thus moving the lever 64. This through the rod 66 will move the frame 45, so as to bring the wheel 44 in position to be engaged by the inclined end 43 of the track 42. The movement of the frame, however, will not be sufficient to bring the wheel 46 into engagement with the large toothed wheel 33. As soon, however, as the wheel 44 is engaged by the said inclined end 43 the wheel 46 will be drawn into engagement with the wheel 33, and consequently the intermediate gearing will be operated to rotate the large wheel 55, situated beneath the press. The length of the track 42 is just sufficient to hold the wheels in contact until the wheel 55 has been turned one revolution. As soon as the wheel 55 is set in motion the mutilated gear 56 on said wheel will rotate the gear-wheel 75 through the idle wheel 72. The rotation of the gear-wheel 75 through the beveled gear-wheels 76 and 77 will rotate the wheel 78. The mutilated gear 79 on the wheel 78 will actuate the bevel gear-wheel 80 and through the pinion 84 and rack 85 will feed the frame 86 across the press. The sheaves 96, carried by the frame 86, will carry the wire across the press until they come in contact with the clamp-holders 134, as shown in Fig. 7. This will bring the wires in position to be engaged by the clamps 138. As soon as the sheaves 96 come in contact with the clamp-holders the motion of the U-shaped parts 95 will be stopped. The frame 86, however, will continue to be fed forward a short distance, the springs 101 allowing for the relative movement of the two parts. The continued forward movement of the frame 86 will bring the pins 102 in contact with the concave portions 142 of the clamps 138 and will thus cause the said clamps to secure the wires. The clamps will be held in their closed position by means of dogs 141. The wire will now be secured in both clamps of the rear clamp-holder and in the inner clamp of the front clamp-holder. The frame 86 will now be withdrawn by the engagement of the mutilated gear 79 with the beveled gear-wheel 81. As the frame is withdrawn one of the hooks 103 will engage with the movable jaw 151 and cause it to sever the wire between the two clamp-holders. After the frame 86 has begun its reverse movement the mutilated gear 57 on the wheel 55 will come in contact with the idle wheel 110, (best shown in Fig. 6,) and consequently rotate the gear-wheel 114 on the lower end of the shaft 115. The movement of the shaft 115 will be communicated through the bevel-gears 117 and 118, Fig. 10, to the spur-wheel 119. The mutilated gearing 120 on the gear-wheel 119 will drive the gear 121. The movement of the gear-wheel 121 will be communicated through the shaft 122 and bevel gear-wheels 125 and 126 (see Fig. 12) to the shaft 127. The bevel gear-wheels 130 on this shaft 127 engage with the bevel-gears 131, driving idle wheels 132. These idle wheels will be driven a sufficient distance to turn the rear clamp-holders 134 through one complete revolution, and thus twist the two ends of the wires secured in the said rear clamp-holders. At the same time the mutilated gear 176 will engage with one of the bevel gear-wheels 175, and thus drive the shaft 172, carrying the pinion 171. This will feed the frame 159 inward until the slots 161 engage the crossed wires, and the idle wheel 167 will be moved into mesh with the gear 178 on the gear-wheel 119, and consequently the member 160 will be rotated to twist the wires in the clamp-holders, and thus firmly secure the wires around the bale. After this operation has been completed the mutilated gear 176 will come into engagement with the other bevel gear-wheel 175 on the shaft 172, and the pinion-wheel 171 will be rotated in the opposite direction to withdraw the frame 159. As the frame 159 is withdrawn the spring-catch 168, carried on the cylindrical member 158, will engage with the arm 146 and release both the clamps of the rear clamp-holder. At the same time the cam-finger 204, Fig. 23, will operate on the cam-block 205 to move the rod 206, and thus release the locking device 203, so that the door 201 will be free to open. The mutilated gear 58 on the wheel 55 will now come into contact with the idle wheel 185, and thus rotate the gear-wheel 186 on the lower end of the sleeve 116. The movement of the sleeve 116 will be communicated, by means of the bevel gear-wheels 187 and 189, to the wheel 190. The mutilated gear 191 on the wheel 190 will rotate the idle wheels 192 and 193 so as to rotate each of the rotary members 135 through one-half a revolution, so as to move the empty clamp-holder to the front of the machine and to bring the clamp-holder having wires secured therein to the rear of the machine. The wire, however, is in the inner clamp of the clamp-holder and would not be in the proper position if the clamp-holder 134 did not move relatively to the rotary member 135. The engagement of the clamp-holder 134 with the lower toothed concave 137 rotates the said member through one half-revolution, so that the clamp holding the wire is brought into the proper position. At the same time the other clampholder is engaged by the upper toothed concave 137 and is turned through one half-revolution to bring it right side up. At the same time the mutilated gear 194 on the wheel 190 coöperates with one of the wheels 195 on the shaft 196 to rotate the pinion 197 to feed the rack 198 to move the ejector 199 across the press, and thus eject the bale. As soon as the bale is ejected the mutilated gear 194 comes into contact with the other of the bevel-gears 195 and returns the ejector 199 to its normal position. As soon as this is accomplished the wheel 55 will have completed one revolution and the track 42 will release the wheel 44, and consequently allow the gear-wheel 46 to drop out to mesh with the wheel 33. The parts will now be in their initial position to begin the formation of a new bale.

Having fully described our invention, what we claim as new, and desire to secure by Letters Patent of the United States, is—

1. In a baling-press, the combination with a driving-wheel, of a plunger driven from said wheel, a track carried by said wheel, securing mechanism for securing the bale, driving mechanism for said securing mechanism, and means operated by the pressure of the bale for throwing said connections into engagement with said track.

2. In a baling-press, the combination with a driving-wheel, of a plunger driven from said wheel, a track carried by said wheel and having an inclined end, securing mechanism for securing the bale, connections for operating said securing mechanism, and means actuated by the pressure of the bale for throwing said connections in the path of the inclined end of said track.

3. In a baling-press, the combination with a driving-wheel, of a plunger driven from said wheel, a track carried by said wheel and having an inclined end, securing mechanism for the bale, operating connections for said securing mechanism, a yielding member carried by said operating connections, and means actuated by the pressure of the bale for throwing said yielding member in the path of the inclined end of said track.

4. In a baling-press, the combination with a driving-wheel, of a plunger driven from said wheel, a track carried by said wheel, a swinging frame provided with a member for engaging with said track, securing mechanism for securing the bale, operating connections controlled by said swinging frame for actuating said securing mechanism, and means actuated by the pressure of the bale for moving said frame for causing the engagement of the member carried thereby with said track.

5. In a baling-press, the combination with a driving-wheel, of a plunger driven thereby, a track carried by said wheel, a swinging frame, a yieldingly-mounted rotary member carried by said frame, securing mechanism for securing the bale, operating connections controlled by said swinging frame for actuating said securing mechanism, and means actuated by the pressure of the bale for moving said frame to cause the engagement of said yieldingly-mounted rotary member with said track.

6. In a baling-press, the combination with a pair of clamp-holders, of a pair of clamps carried by each of said holders, means for transposing said clamp-holders, and operating mechanism for said clamps.

7. In a baling-press, the combination with a pair of clamp-holders, of a pair of clamps carried by each of said holders, means for transposing the clamps carried by one of said holders, means for transposing said holders, and operating mechanism for said clamps.

8. In a baling-press, the combination with a pair of clamp-holders, of means for transposing said holders, a pair of clamps carried by each of said holders, means for transposing the clamps carried by one of said holders, and means for securing the wire in one clamp of each holder.

9. In a baling-press, the combination with a pair of clamp-holders, of means for transposing said holders, a pair of clamps carried by each holder, means for transposing the clamps carried by one of said holders, means for securing the wire in one clamp of each holder, and means for twisting the wire held in the two clamps of one holder.

10. In a baling-press, the combination with a pair of clamp-holders, of means for transposing said holders, a pair of clamps carried by each holder, means for transposing the clamps carried by one of said holders, means for securing the wire in one clamp of each holder, means for twisting the wire held in the two clamps of one holder, and means for releasing both clamps of one holder.

11. In a baling-press, the combination with a rotary member, of clamp-holders carried by said rotary member, a pair of wire-clamps carried by each of said clamp-holders, and means for operating said rotary members and clamps.

12. In a baling-press, the combination with a rotary member, of a pair of clamp-holders rotatably carried by said rotary member, and yielding devices normally holding said clamp-holders against movement relative to said rotary member.

13. In a baling-press the combination with a rotary member, of clamp-holders carried by said rotary member, a pair of wire-clamps carried by each clamp-holder, means for securing the wire in one clamp of each holder, and means for twisting the wire.

14. In a baling-press, the combination with a rotary member, of clamp-holders carried by said rotary member, a pair of wire-clamps carried by each holder, means for securing the wire in one clamp of each holder, means for severing the wire between the holders, means for turning one of said clamp-holders, and means for releasing the wire from both clamps of one holder.

15. In a baling-press, the combination with a rotary member, a pair of clamp-holders mounted on said rotary member, a pair of clamps carried by each clamp-holder, means for securing the wire in one clamp of each holder, means for severing the wire, gearing actuating one of said clamp-holders to cross the wire, and a twisting device for twisting the crossed wire.

16. In a baling-press, the combination with a rotary member, of a pair of clamp-holders carried by said rotary member, a pair of clamps carried by each clamp-holder, means for securing the wire in one clamp of each holder, means actuated by the wire-securing device for severing the wire, means for twisting the wire, and means for releasing the wire from both clamps of one holder.

17. In a baling-press, the combination with a rotary member, of a pair of clamp-holders carried by said rotary member, a pair of clamps carried by each clamp-holder, means for securing the wire in one clamp of each holder, means actuated by said wire-securing device for severing the wire between the holders, means for rotating one of said holders to cross the wire, and means for twisting the crossed wire.

18. In a baling-press, the combination with a rotary member, of a pair of clamp-holders carried by said rotary member, a pair of wire-clamps carried by each clamp-holder, means for securing the wire in one clamp of each holder, means for severing the wire between the holders, gearing for rotating one of said holders to cross the wire, and a wire-twisting device adapted to project through the holder to twist the crossed wire.

19. In a baling-press, the combination with a rotary member, of a pair of clamp-holders rotatably mounted on said rotary member, a pair of wire-clamps carried by each clamp-holder, means for securing the wire in one clamp of each holder, means for severing the wire between said holders, gearing for one of said holders to cross the wire, a wire-twisting device for twisting the crossed wire, and means actuated by said wire-twisting device for releasing both clamps of one clamp-holder.

20. In a baling-press, the combination with a rotary member, of a pair of clamp-holders rotatably mounted on said rotary member, a pair of wire-clamps carried by each clamp-holder, means for securing the wire in one clamp of each holder, means actuated by said wire-securing device for severing the wire, between the holders, gearing for rotating one of said holders to cross the wire, a wire-twisting device for twisting the crossed wire, and means actuated by said wire-twisting device for releasing both clamps of one clamp-holder.

21. In a baling-press, the combination with a rotary member, of a pair of clamp-holders rotatably mounted on said rotary member, a pair of wire-clamps carried by each clamp-holder, means for securing the wire in one clamp of each holder, means actuated by said wire-securing device for severing the wire between said holders, gearing for rotating one of said holders to cross the wire, a wire-twisting device adapted to project through the holder to twist the crossed wire, and means actuated by said wire-twisting device for releasing both clamps of one clamp-holder.

22. In a baling-press, the combination with a rotary member, of a pair of clamp-holders rotatably mounted on said rotary member, a pair of wire-clamps carried by each clamp-holder, a wire-feeding device for securing the wire in one clamp of each holder, and means operated by said wire-feeding device for severing the wire between the clamp-holders.

23. In a baling-press, the combination with a rotary member, of a pair of clamp-holders carried by said rotary member, a pair of clamps carried by each clamp-holder, a wire-feeding device for securing the wire in one clamp of each holder, means for severing the wire between the holders, means for rotating one of said holders through a complete revolution to cross the wire, and means for twisting the wire.

24. In a baling-press, the combination with a rotary member, of clamp-holders carried by said rotary member, a pair of wire-clamps carried by each holder, a sliding frame, means for moving said frame across the press, and a wire-feeding device yieldingly carried by said frame for presenting the wire to said wire-clamps.

25. In a baling-press, the combination with a rotary member, of clamp-holders carried by said rotary member, a pair of wire-clamps carried by each clamp-holder, a sliding frame, means for moving said frame across the press, a wire-feeding device yieldingly carried by said frame for presenting the wire to said wire-clamps, and means rigidly carried by said frame for operating said clamps to clamp the wire.

26. In a baling-press, the combination with a rotary member, of clamp-holders carried by said rotary member, a pair of wire-clamps carried by each clamp-holder, a sliding frame, means for feeding said frame across the press, a wire-feeding device carried by said frame for presenting the wire to said clamps, means carried by said frame for operating said clamps to clamp the wire, a wire-severing device, and means carried by said frame for actuating said wire-severing device.

27. In a baling-press, the combination with a plunger, of means for operating the same, and a yieldingly-mounted wing extending across the press to form the front end of the bale.

28. In a baling-press, the combination with a plunger, of means for operating said plunger, and a pair of spring-mounted wings extending across the press to form the front end of the bale.

29. In a baling-press, the combination with a plunger, of means for operating said plunger, and a spring-mounted wing extending across the press to form the front end of the bale, said wing being arranged to swing back against the side of the press.

In testimony whereof we have hereunto set our hands and affixed our seals in the presence of the two subscribing witnesses.

MARSHAL E. JONES. [L. S.]
JOHN E. SCHAFER. [L. S.]

Witnesses:
W. A. ALEXANDER,
D. C. BETJEMAN.